(12) United States Patent
Ndu et al.

(10) Patent No.: US 10,248,814 B2
(45) Date of Patent: Apr. 2, 2019

(54) MEMORY INTEGRITY MONITORING

(71) Applicant: HEWLETT PACKARD ENTERPRISE DEVELOPMENT LP, Houston, TX (US)

(72) Inventors: Geoffrey Ndu, Bristol (GB); Adrian Shaw, Bristol (GB); Brian Quentin Monahan, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 243 days.

(21) Appl. No.: 15/415,450

(22) Filed: Jan. 25, 2017

(65) Prior Publication Data

US 2018/0211064 A1    Jul. 26, 2018

(51) Int. Cl.
*H04L 9/06* (2006.01)
*H04L 9/32* (2006.01)
*G06F 21/60* (2013.01)
*G06F 21/64* (2013.01)

(52) U.S. Cl.
CPC ............ *G06F 21/64* (2013.01); *G06F 21/602* (2013.01); *H04L 9/0643* (2013.01); *H04L 9/3236* (2013.01)

(58) Field of Classification Search
CPC ..... G06F 21/64; G06F 21/602; H04L 9/0643; H04L 9/3236
USPC ......................................................... 713/193
See application file for complete search history.

(56) References Cited

U.S. PATENT DOCUMENTS

| 8,234,350 B1* | 7/2012 | Gu .................. H04N 21/234309 709/203 |
| 8,726,042 B2* | 5/2014 | Lange ..................... G06F 21/64 713/189 |
| 2006/0230274 A1 | 10/2006 | Surendran et al. |
| 2007/0242681 A1* | 10/2007 | Kono ...................... H04L 47/10 370/401 |

(Continued)

FOREIGN PATENT DOCUMENTS

WO  PCT/US2015/063945    12/2015

OTHER PUBLICATIONS

Intel Corporation, "Intel Kernel Guard Technology," (Web Page), copyright 2017, 3 pages, available at https://01.org/intel-kgt.

(Continued)

*Primary Examiner* — Michael S McNally
(74) *Attorney, Agent, or Firm* — Hewlett Packard Enterprise Patent Department

(57) ABSTRACT

In one example in accordance with the present disclosure, a system comprises a first memory module and a first memory integrity monitoring processor, embedded to the first memory module, to receive a second hash corresponding to a second memory module. The second hash includes a second sequence number for reconstruction of a final hash value and the second hash is not sequentially a first number in a sequence for reconstruction of the final hash value. The first processor may receive a third hash corresponding to a third memory module. The third hash includes a third sequence number for reconstruction of the final hash value and the third hash is received after the second hash. The first processor may determine if the second hash can be combined with the third hash, combine the second hash and third hash into a partial hash reconstruct the final hash value using the partial hash.

20 Claims, 6 Drawing Sheets

(56) References Cited

U.S. PATENT DOCUMENTS

| | | | |
|---|---|---|---|
| 2008/0250100 A1* | 10/2008 | Hatanaka | G06F 17/30799 709/203 |
| 2009/0217377 A1 | 8/2009 | Arbaugh et al. | |
| 2010/0131732 A1* | 5/2010 | Busser | G06F 21/645 711/165 |
| 2010/0153732 A1 | 6/2010 | Su | |
| 2014/0281354 A1* | 9/2014 | Tkacik | G06F 12/1009 711/206 |
| 2014/0359239 A1* | 12/2014 | Hiremane | G06F 21/575 711/163 |
| 2016/0232354 A1 | 8/2016 | Fraser et al. | |
| 2016/0232379 A1* | 8/2016 | Edwards | G06F 21/52 |

OTHER PUBLICATIONS

Morgan, B. et al., "Design and Implementation of a Hardware Assisted Security Architecture for Software Integrity Monitoring," (Research Paper), May 28, 2016, 10 pages, available at https://hal.archives-ouvertes.fr/hal-01322882/document.

Schmidt, C., "RISCV-Angel," (Web Page), copyright 2016, 3 pages, available at https://riscv.org/software-tools/riscv-angel/.

* cited by examiner

MEMORY INTEGRITY MONITORING

BACKGROUND

Certain data structures and/or Operating System (OS) pages may not normally change during runtime of a computer system. Runtime integrity monitoring involves using cryptography, such as hashing, to detect unauthorized changes to these data structures/OS pages.

BRIEF DESCRIPTION OF THE DRAWINGS

The following detailed description references the drawings, wherein.

DETAILED DESCRIPTION

Figure 1A:
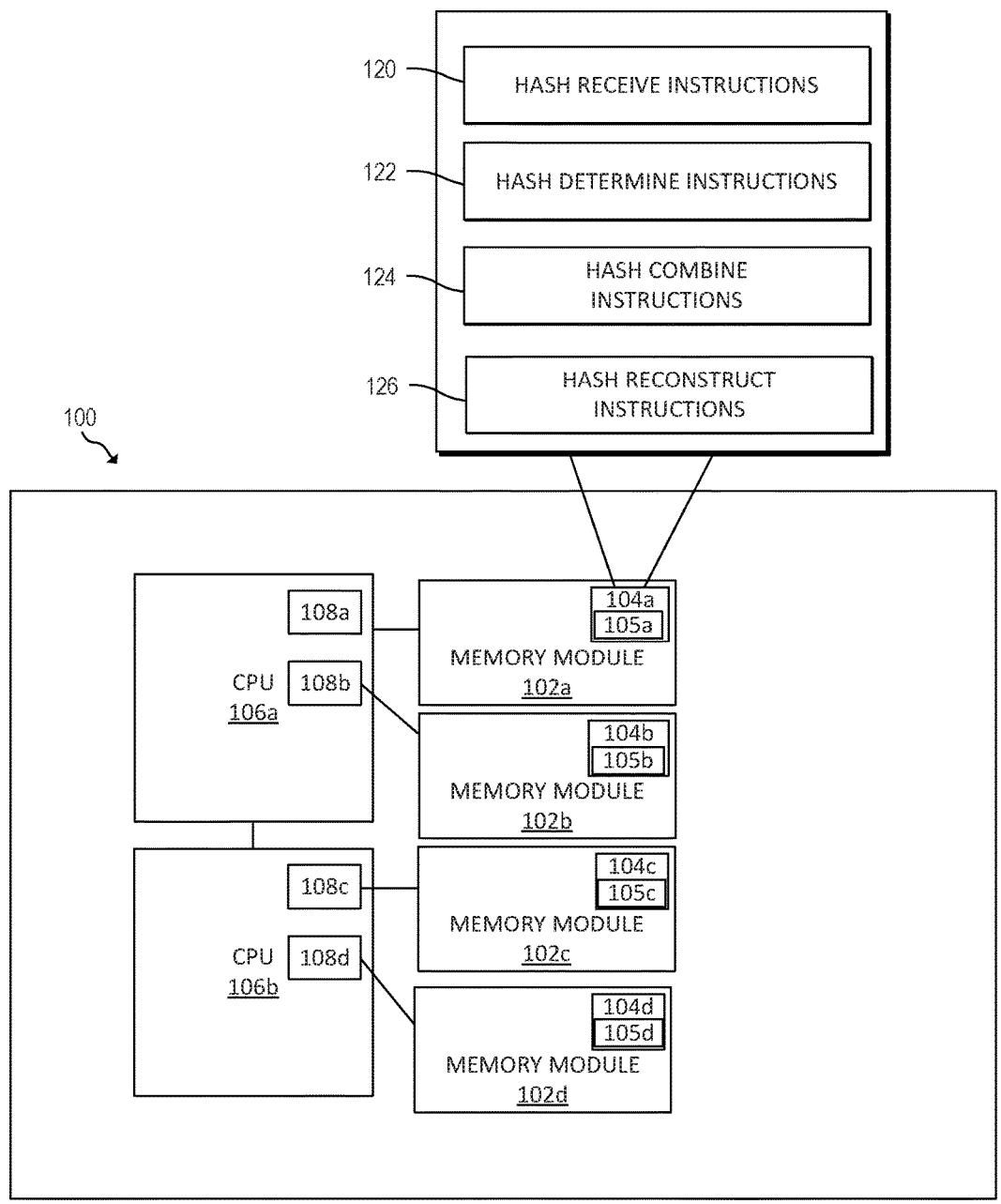
FIG. 1A is a block diagram of an example system in which memory integrity monitoring may be useful.

Runtime integrity monitoring is a solution for protecting system software at runtime but high overhead is a barrier to its widespread adoption. Specifically, software-based integrity monitoring solutions may have significant CPU performance overhead, thus far reducing their practicability. For example, a software based solution may run the integrity monitoring code on a segregated (logical) processor core which periodically inspects the system software on the main processor core for malicious changes. The monitoring may suspend the execution of the monitored system software to make measurements introducing significant overhead. Some systems reduce the frequency of integrity check to minimize overhead which may cause changes not to be detected in good time.

Certain newer memory types, such as non-volatile memory (NVM), storage class memory (SCM) may be much bigger and/or slower than traditionally used forms of memory, so copying data from memory to CPU or external device (such as a coprocessor) may be computationally expensive. This may lead to designs where integrity systems that are external to the memory module (i.e. part of a processor or coprocessor) perform fewer checks on the memory, hence increasing the chances of an attack. Moving data back and forth from memory system to the CPU or coprocessor may be computationally expensive and may consume large amounts of power. Moreover, moving data back and forth may use up bandwidth and slow down other workloads.

Aspects of the memory side accelerator discussed herein may use a programmable hardware accelerator, embeddable inside a memory controller, for real-time runtime integrity checking. This hardware and software co-design solution may reduce or eliminate much of the CPU overhead of current software-based solutions.

Moreover, in some aspects a memory region may be spread across a plurality of memory modules, each memory module having an embedded integrity monitor and memory integrity monitor processor for creating hashes for that memory module. Accordingly, aspects of the memory side accelerator discussed herein may employ techniques such that a final hash can be built even if the partial hashes are not received in a particular order. In other words, aspects of the memory accelerator discussed herein support distributed and parallel accumulation of hashes.

A system for memory integrity monitoring may comprise a first memory module and a first memory integrity monitoring processor embedded to the first memory module. The first memory integrity monitoring processor may receive, from a second memory integrity monitoring processor coupled to a second memory module, a second hash corresponding to a second memory region of the second memory module, wherein the second hash includes a second sequence number for reconstruction of a final hash value and the second hash is not sequentially a first number in a sequence for reconstruction of the final hash value. The first memory integrity monitoring processor may receive, from a third memory integrity monitoring processor coupled to a third memory integrity monitoring processor, a third hash corresponding to a third memory region of the third memory module, wherein the third hash includes a third sequence number for reconstruction of the final hash value. The first memory integrity monitoring processor may determine, based on the second and third sequence numbers, if the second hash can be combined with the third hash. The first memory integrity monitoring processor may combine the second hash and third hash into a partial hash and reconstruct the final hash value using the partial hash.

FIG. 1A is a block diagram of an example system 100 including a plurality of memory modules 102a-d, each memory module 102 enabled with an integrity monitor 104 (i.e., memory modules 102a, 102b, 102c, 102d being enabled with integrity monitors 104a, 104b, 104c, 104d, respectively). Memory modules 102a-d may include any volatile memory, non-volatile memory (NVM), storage class memory (SCM) or any suitable combination of volatile and non-volatile memory. Memory modules 102a-d may comprise Random Access Memory (RAM), Read-Only Memory (ROM), flash memory, and/or other suitable memory. Memory modules 102a-d may also include a random access non-volatile memory that can retain content when the power is off. Memory modules 102a-d may be used by system 100 for storing data, such as encrypted data. Memory modules 102a-d may also be a mix of different types of memory and/or memory from different systems.

Integrity monitors 104a-d may each be a hardware unit embedded inside the module-level memory controller (sometimes called a media controller or split memory controller). Integrity monitors 104a-d may include an embedded memory integrity monitor processors 105a-d, respectively. Each integrity monitor 104a-d may be a programmable processor embedded in the memory/media controller allowing the main processor to offload computation. Integrity monitors 104a-d may be programmable processors. Memory integrity monitoring processors 105a-d may have accelerators attached to them to speed up the calculation of hashes inside the memory integrity monitors. These accelerators may be attached to the memory integrity monitoring processors 105a-d via an interface. The interface may be, for example, based on Rocket Custom Coprocessor interface (RoCC). Integrity monitors 104a-d may be a processor with or without specialized hashing (e.g. SHA3) coprocessors and/or accelerators placed inside the module-level memory controller.

Integrity monitors 104a-d and/or memory integrity monitoring processors 105a-d may include, for example, a RISC-V® based memory side accelerator extended with a hash coprocessor and the associated software to implement different hashing techniques, discussed throughout this application. The associated software could be implemented in microcode in some implementations. The integrity monitors 104a-d and/or memory integrity monitoring processors 105a-d could also be used for general data integrity checking as there are many important applications that rely on hashing.

System 100 may include at least one processing core that may include a Central Processing Unit (CPU) or another suitable hardware processor. For example, in FIG. 1A, system 100 includes CPUs 106a and 106b. Each CPU may have corresponding memory channels for communication with the memory modules 102a-d. For example, CPU 106a may have memory channel 108a for communication with memory module 102a and memory channel 108b for communication with memory module 102b. Similarly, CPU 106b may have memory channel 108c for communicating with memory module 102c and memory channel 108d for communicating with memory module 104d. Although FIG. 1A illustrates two CPUs, each having two memory channels, this is one aspect and other aspects may have different numbers of CPUs more or less than two with different numbers of memory channels that are more or less than two.

Memory integrity monitors 104a-d may be programmable from one of the CPUs 106a and/or 106b, via a mailbox framework. Programs can be loaded on the memory integrity monitors 104a-d by firmware as well. The CPUs 106a and 106b may interface with the memory integrity monitors 104a-d and/or memory integrity monitoring processors 105a-d. The main CPU i.e. 106a-b may use a protocol, such as Gen-Z, to interface with the memory integrity monitors 104a-d. The mailbox framework may be built on top of the separate protocol.

When a CPU encounters an instruction for the integrity monitor, the CPU may forward the instruction and any associated registers to the memory integrity monitors 104a-d and/or the memory integrity monitoring processors 105a-d. The data forwarded to the memory integrity monitor may contain the memory region corresponding to calculated hashes. The memory integrity monitors 104a-d may forward the instruction to the memory integrity monitoring processors 105a-d.

The memory integrity monitoring processors 105a-d may acknowledge the instructions and, using the memory address provided, may copy the input data into its internal storage. The interface may allow the memory integrity monitor processor to directly access the L1 data cache (not pictured) of the CPU. The memory integrity monitoring processors 105a-d may then calculate the hash digest and writes the hash digest to the designated memory address. More detail about the hashing process is described below in respect to instructions 120, 122, 124 and 126. The memory integrity monitor processor may be able to sustain multiple outstanding transactions The Integrity monitors 104a-d and memory integrity monitoring processors 105a-d may allow the memory module 102 to perform integrity monitoring of its contents without relying on an external system, such as CPU 106a and 106b. The combination of memory module 102 and integrity monitor 104 may be a self-monitoring memory module. Because the integrity monitor 104 is embedded in memory module 102, it may be difficult fora malicious software running on the introspected system (e.g., system 100) to interfere with the integrity monitor 104.

As illustrated in FIG. 1A, system 100 may include a plurality of memory modules 102. In some aspects, the system 100 may employ memory interleaving among the plurality of memory modules 102. Memory interleaving means that a memory region for the system 100 (and thus accessed by computers, operating systems, system software, etc., accessing the system 100) could be spread over multiple memory modules 102 or media controllers (MC). The memory region may include data such as system software data structures that are supposed to be unchanged at runtime. Accordingly, system 100 may employ integrity monitoring of this memory through, for example, hashing. Memory interleaving, however, may make it difficult to build hash accumulation data structures, such as Merkle trees, used in integrity monitoring.

The basic primitive used in integrity monitoring system may be a cryptographic hash function used to detect changes. When a memory region is spread over many memory modules 102, however, it may be difficult to build a hash to check the memory region.

In the example illustrated in FIG. 1A, system 100 may fetch, decode, and execute instructions 120, 122, 124 and 126 to build hash accumulation structures that account for partial hashes that arrive out-of-order. With respect to the executable instruction representations (e.g., boxes) described and shown herein, it should be understood that part or all of the executable instructions and/or electronic circuits included within one box may be included in a different box shown in the figures or in a different box not shown.

To calculate a hash digest for memory region spread over the plurality of memory modules 102, a partial hash may be calculated on each integrity monitor 104a-d (via the memory integrity monitoring processors 105a -d) corresponding to the respective memory module 102. A single integrity monitor (via the corresponding memory integrity monitoring processor) may then be used to accumulate/combine the partial hashes, out- of-order, into the final hash. Any one of the integrity monitors 104a-d may be able to trigger computation of the final hash (via the corresponding memory integrity monitoring processor 105) on a different integrity monitor 104a-d and/or also on the same monitor 104a-din system 100.

The example system 100 includes four memory modules 102a-d. Accordingly, the memory region accessed by system 100 may be spread across at least some of the memory modules 102a-d. Although system 100 of FIG. 1A includes four memory modules and four memory monitoring processors, this is for illustrative purposes and any number of memory modules and memory monitoring processors may be used. Accordingly, different portions of data accessed by the system may be on different memory modules. These different portions of data may be analyzed to detect changes to the data. In other words, the integrity of the memory may be considered by determining if any unauthorized changes have been made to the memory. This may be done by comparing the current state of the memory to a previous state known to be uncorrupted.

Memory integrity monitoring processors 105a-d may implement a hashing technique. Hashing is a process by which some data is transformed into a usually shorter fixed-length value or key that sufficiently identifies the data. Hashing, and specifically cryptographic hashing primitive, may allow for the efficient detection of change. Specifically, each memory integrity monitor processor 105a-d may hash a memory region of the corresponding memory module. In other words, memory integrity monitoring processor 105a may create a first hash from a memory region of memory module 102a, memory integrity monitoring processor 105b may create a second hash a memory region of memory module 102b, memory integrity monitoring processor 105c may create a third hash from memory region of memory module 102c and memory integrity monitoring processor 105d may create a fourth hash from memory region of memory module 102d. However, because the memory region is spread across four memory modules, the four hashes may be combined to form a final hash value for comparison. Put another way, the final hash value may be reconstructed from the hashes of the individual memory modules. One of the memory integrity monitoring processors 105a-d may be selected to perform the reconstruction.

In one aspect, memory integrity monitoring processor 105a may be selected to perform the reconstruction of the four hashes. Accordingly, the memory integrity monitoring processor 105a may receive the second hash (corresponding to memory module 102b) from memory integrity monitoring processor 105b. Similarly, the memory integrity monitoring processor 105a may receive the third and fourth hash (corresponding to memory modules 102c and 102d, respectively) from memory integrity monitoring processor 105c and 105d, respectively. However, the order that the hashes are sequentially received by memory integrity monitoring processor 105a may not match the order that the hashes are to be reconstructed to make the final hash. For example, memory integrity monitoring processor 105a may create the first hash and receive the remaining hashes in the following sequential order: (1) second hash, (2) third hash and (3) fourth hash. However, arrival order for reconstruction may, for example, be: (1) fourth hash (2) first hash (3) third hash and (4) second hash. Updates to the memory hashes may occur non-sequentially, even though the overall hashes occur in a given order. Performing all the hash updates sequentially may impose an unacceptable delays in providing valid overall hashes.

Figure 1B:
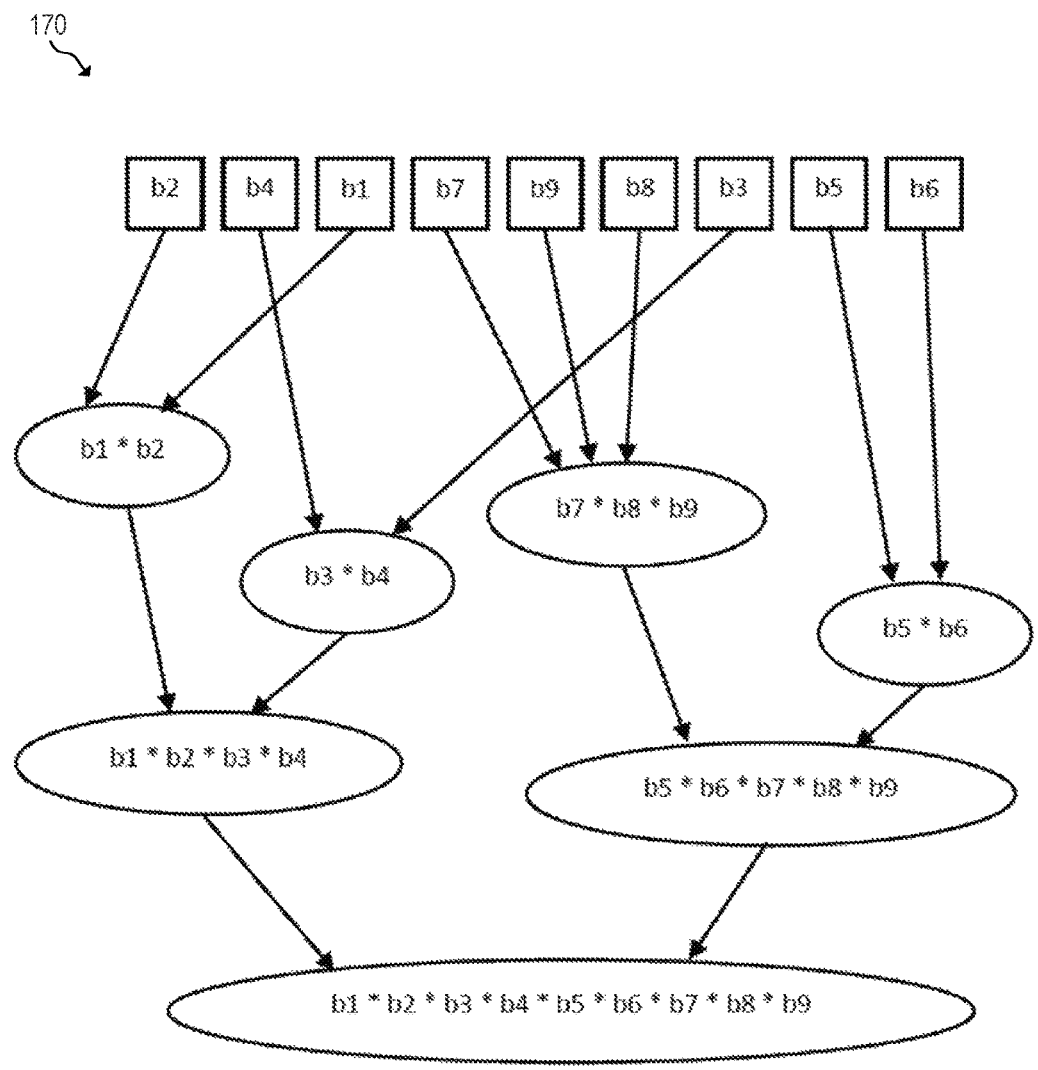
FIG. 1B is an example combining of hashes.

A summary overall hash may be computed for all memory regions. A data structure, such as a tree like data structure, is constructed to contain the basic hashes from each memory module. These basic hashes may change in response to changes in the contents of memory. Using the data structure, we can combine only the hashes that are changed or updated to minimize the amount of recomputation of summary hashes. Summary hashes may then be used to combine the basic hashes together (and so on) in a tree-like manner. FIG. 1B illustrates an example combining 170 of hashes as taught herein. FIG. 1B shows a plurality of hash values, shown as b1 to b9, of a sequence of data blocks. Hash values b1-b9 may include identifying information, such as unique headers, that identify the respective data block's position within a sequence. In the example shown in FIG. 1B, hash values b1-b9 may not be in numerical order when processed. The processes taught herein allow for hashing of the data blocks by combining partial hashes of a subset of the data blocks.

The function for combining the hash values may be both associative and non-commutative. An associative operation is one in which the order of operation may not matter in obtaining the same result. For example, an operation $\theta$ is associative when for x, y, and z: $x \theta (y \theta z) = (x \theta y) \theta z$. As a result, a combining operation, such as concatenation may occur in multiple steps. For example, as illustrated in FIG. 1B, hash value 421 and hash value 422 may be combined into combined value 432. Each hash value 423-427 may then be sequentially combined into the combined value. However due to associativity, hash value 428 and hash value 429 may first be combined into combined value 439 before being combined into the overall combined value to form combined value 430.

In some examples, the combined value of the hash values may retain the same sequence as the sequence of data blocks. This allows for the operation to combine the hash values to be non-commutative. A non-commutative operation is one which produces different results when the inputs are in a different order. For example, an operation $\theta$ is non-commutative when for some x, y: $(x \theta y) \neq (y \theta x)$. Accordingly, to produce a correct combined hash, the sequence of hash values in the combined value should retain the sequence of the data blocks.

Due to the associative properties of the functions herein, hashes may be combined in any order as long as the sequence of the hashes reflect the sequence of the data blocks. Turning again to FIG. 1B, for example, b1 may be combined with b2, b3 may be combined with b4, and then the two intermediate hash values may be combined. Hashes may be combined as soon as a subsequent hash is processed in the correct order. Thus, examples herein provide for flexible and efficient combining of hashes of data blocks.

In one example, a simple update may affect, for example, the primitive hash of 3rd memory block. Memory integrity monitoring processor 105a may receive an updated hash of memory block 3 and combine the updated hash of memory block 3 with an unchanged hash of memory block 4 to build a new combined summary hash for memory blocks 3 and 4. This new summary hash may then be further combined hierarchically with the already existing and unchanged combined summary hash for block 1 and 2 producing a new overall master hash for memory blocks 1 to 4. No recalculation of that combined hash for block 1 and 2 may be performed. Note that not all blocks need to be recomputed. This saving may scales as the total number of blocks increases.

For example, changing a data block or its position may cause changes to the resulting master hash. Various hash functions may be employed to calculate the master hash. For example, the same or different hash function as that executed in instructions 121 may be utilized, such as a cryptographic hash function.

In some examples, a hash value of a data block may be calculated as it arrives, and then the hash value is inserted into an overall hash-string in the corresponding location in the string. Thus, each hash value for each block has a corresponding position in the overall hash-string.

Furthermore, because the hash values are independently calculated, segments of partial hashes may be separately computed and then concatenated together later. As long as each segment is positioned correctly relative to the other segments, the order of concatenation may not affect the operation due to associativity. However, the order of the data blocks is retained because the operation is non-commutative. In other words, changing the position of the hash in the sequence of the blocks may cause changes to the resulting hash-string. Once the hash-string has been constructed, Memory integrity monitoring processor 105a may calculate a master hash value for the hash-string.

The integrity monitors 104a-d may have different modes of operation. A hash mode may be used to hash a list of memory regions and save the digests to memory. An active hash mode may actively monitor memory regions. In both the hash mode and the active hash mode, the hash function may be evaluated and compared to the digest located at a predefined memory address. If a mismatch occurs, an interrupt may be raised. A tree mode may include building an integrity tree from memory regions specified in a descriptor. The modes may be run as background tasks on the integrity monitors 104a-d. System 100 may leverage these modes to provide near real-time monitoring of memory without having to suspend executing system software.

Figure 2:
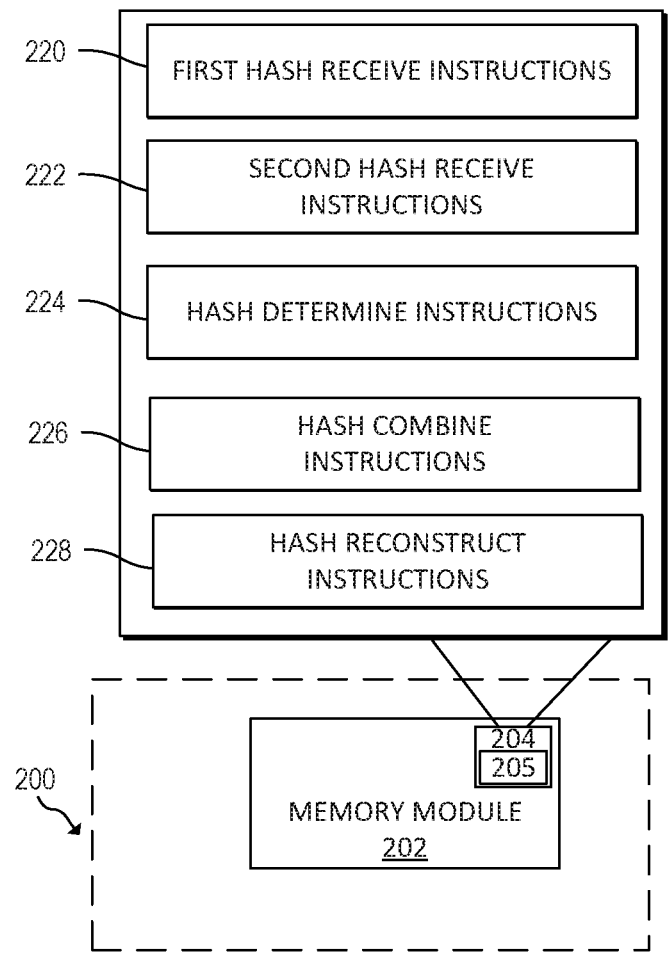
FIG. 2 is a block diagram of an example system for memory integrity monitoring.

FIG. 2 is a block diagram of an example system 200 for memory integrity monitoring. System 200 may be similar to system 100 of FIG. 1A, for example. In the example illustrated in FIG. 2, system 200 includes a memory module 202, an integrity monitor 204 and a memory integrity monitoring processors 205. Memory module 202 may be similar to memory modules 102a-d of system 100. Integrity monitor 204 may be similar to integrity monitors 204a-d of system 100. Memory integrity monitoring processor 205 may be similar to memory integrity monitoring processors 205a-d of system 100.

Memory module 202 may include any volatile memory, non-volatile memory (NVM), storage class memory (SCM) or any suitable combination of volatile and non-volatile memory. Memory modules 202 may comprise Random Access Memory (RAM), Read-Only Memory (ROM), flash memory, and/or other suitable memory. Memory module 102 may also include a random access non-volatile memory that can retain content when the power is off. Memory module 202 may be used by system 200 for storing data, such as encrypted data. Memory module 202 may also be a mix of different types of memory and/or memory from different systems.

Integrity monitor 204 may be a hardware unit embedded inside the module- level memory controller (sometimes called a media controller or split memory controller). Memory integrity monitoring processor 205 may be a processor embedded into the memory module. Memory integrity monitoring processor 205 may be a programmable processor embedded in the memory/media controller allowing main processor of the system 200 to offload computation. For example, memory integrity monitoring processor 205 may be a programmable processor. In some implementations, the memory integrity monitoring processor 205 may be a processor with specialised hashing (e.g. SHA3) coprocessor(s) and/or accelerators placed inside the module-level memory controller.

Memory module 202 may store instructions to be executed by integrity monitor 204 including instructions for implementing first hash receive instructions 220, second hash receive instructions 222, hash determine instructions 224, hash combine instructions 226, hash reconstruct instructions 228 and/or other components. Furthermore, in FIG. 1A and other Figures described herein, different numbers of components or entities than depicted may be used. Instructions 220, 222, 224, 226 and 228 may be similar to instructions 120, 122, 124, 126 and 128 as described above in reference to FIG. 1A.

Memory integrity monitoring processor 205 may execute first hash receive instructions 220 to receive, from a second memory integrity monitoring processor coupled to a second memory module, a second hash corresponding to a second memory region of the second memory module. The second hash may include a second sequence number for reconstruction of a final hash value and the second hash may not sequentially be a first number in a sequence for reconstruction of the final hash value. Memory integrity monitoring processor 205 may execute second hash receive instructions 222 to receive, from a third memory integrity monitoring processor coupled to a third memory integrity monitoring processor, a third hash corresponding to a third memory region of the third memory module. The third hash may include a third sequence number for reconstruction of the final hash value and the third hash may be received after the second hash.

Memory integrity monitoring processor 205 may execute hash determine instructions 224 to determine, based on the second and third sequence numbers, if the second hash can be combined with the third hash. Memory integrity monitoring processor 205 may execute hash combine instructions 226 to combine the second hash and third hash into a partial hash. Memory integrity monitoring processor 205 may execute hash reconstruct instructions 228 to reconstruct the final hash value using the partial hash.

Figure 3:
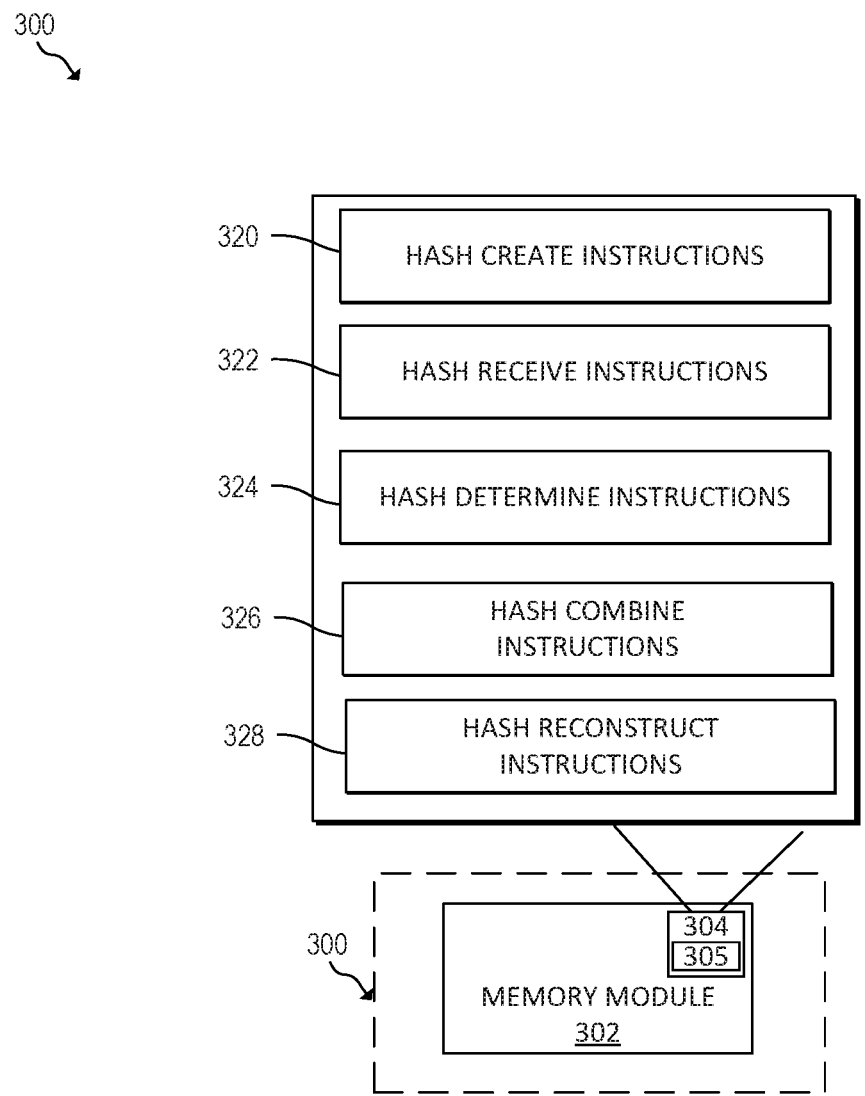
FIG. 3 is a block diagram of example memory module with an embedded memory integrity monitor.

FIG. 3 is a block diagram of an example memory module 302. In the example illustrated in FIG. 3, memory module 302 includes an integrity monitor 304 with an embedded memory integrity monitoring processor 305. Memory module 302 may be similar to memory modules 102a-d of system 100. Integrity monitor 304 may be similar to integrity monitors 104a-d of system 100. Memory integrity monitoring processor 205 may be similar to memory integrity monitoring processor 205a-d.

Memory module 302 may include any volatile memory, non-volatile memory (NVM), storage class memory (SCM) or any suitable combination of volatile and non-volatile memory. Memory modules 202 may comprise Random Access Memory (RAM), Read-Only Memory (ROM), flash memory, and/or other suitable memory. Memory module 102 may also include a random access non-volatile memory that can retain content when the power is off. Memory module 302 may be used by system 300 for storing data, such as encrypted data. Memory module 302 may also be a mix of different types of memory and/or memory from different systems.

Integrity monitor 304 may be a hardware unit embedded inside the module-level memory controller (sometimes called a media controller or split memory controller). Memory integrity monitoring processor 305 may be a processor embedded into the memory module. Memory integrity monitoring processor 305 may be a programmable processor embedded in the memory/media controller allowing main processor of the system 200 to offload computation. In some implementations, the memory integrity monitoring processor 305 may be a programmable processor. Memory integrity monitoring processor 305 may be a processor with specialised hashing (e.g. SHA3) coprocessors and/or accelerators placed inside the module-level memory controller.

Memory module 302 may store instructions to be executed by integrity monitor 204 including instructions for implementing first hash create instructions 320, hash receive instructions 322, hash determine instructions 324, hash combine instructions 326, hash reconstruct instructions 328 and/or other components. Furthermore, in FIG. 1A and other Figures described herein, different numbers of components or entities than depicted may be used. Instructions 320, 322, 324, 326 and 328 may be similar to Instructions 220, 222, 224, 226 and 228 of FIG. 2 and instructions 120/122, 124, 126 and 128 as described above in reference to FIG. 1A.

Memory integrity monitoring processor 305 may execute hash create instructions 320 to hash a data structure, stored on the first memory module, to create a first hash. The first hash may include a first sequence number for reconstruction of a final hash value and the first hash may correspond to a first memory region of the first memory module. Memory integrity monitoring processor 305 may execute hash receive instructions 322 to receive a plurality of hashes from a plurality of respective memory modules. Each hash may correspond to a memory region of the respective memory module and each hash may have a respective sequence number for reconstruction of the final hash value. Memory integrity monitoring processor 305 may execute hash determine instructions 324 to determine, for each hash value received, if the hash value can be combined with the first hash or another previously received hash.

Memory integrity monitoring processor 305 may execute hash combine instructions 326 to combine at least two hashes into a partial hash, wherein the partial hash does not include the first sequential number of the reconstruction sequence. Memory integrity monitoring processor 305 may execute hash reconstruct instructions 328 to reconstruct the final hash value using the partial hash.

Figure 4:
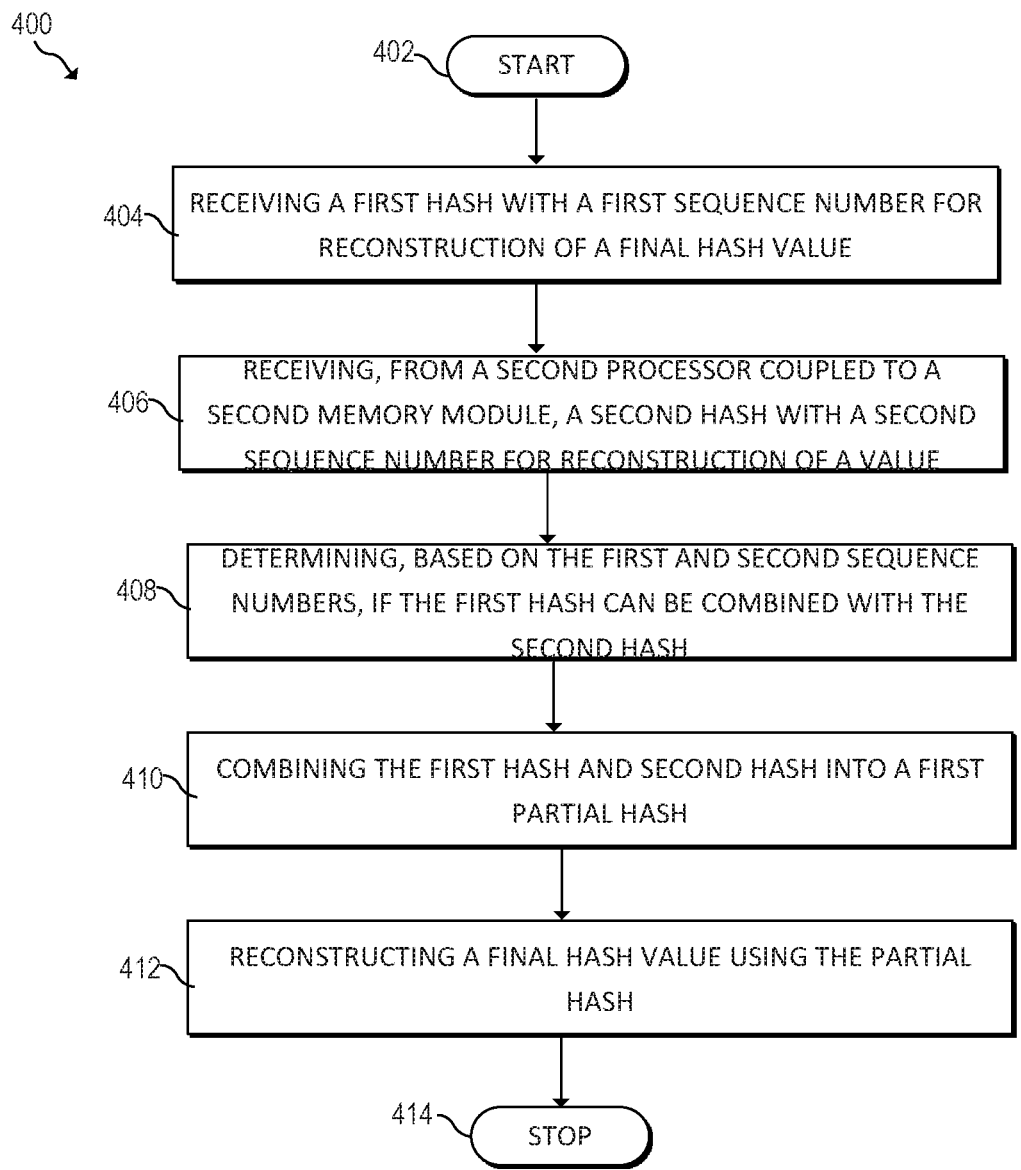
FIG. 4 is a flowchart of an example method for memory integrity monitoring.

FIG. 4 is a flowchart of an example method 400 for memory integrity monitoring. Method 400 may be described below as being executed or performed by a system, for example, system 100 of FIG. 1A, system 200 of FIG. 2 or memory module 302 of FIG. 3. Other suitable systems and/or computing devices may be used as well. Method 300 may be implemented in the form of executable instructions stored on at least one machine-readable storage medium of the system and executed by at least one processor of the system. The processor may include a memory integrity monitoring processor, a Central Processing Unit (CPU) or another suitable hardware processor. The machine-readable storage medium may be non-transitory. Method 400 may be implemented in the form of electronic circuitry (e.g., hardware). At least one block of method 400 may be executed substantially concurrently or in a different order than shown in FIG. 4, unless explicitly noted otherwise. Method 400 may include more or less blocks than are shown in FIG. 4. Some of the blocks of method 400 may, at certain times, be ongoing and/or may repeat.

Method 400 may start at block 402 and continue to block 404, where the method may include receiving, from a first hardware processor coupled to a first memory module, a first hash with a first sequence number for reconstruction of a final hash value. The first hash may include a first sequence number for reconstruction of a final hash value and the first hash may not sequentially be a first number in a sequence for reconstruction of the final hash value. At block 406, the method may include receiving, from a second processor coupled to a second memory module, a second hash with a second sequence number for reconstruction of the final hash value. The second hash may include a second sequence number for reconstruction of the final hash value and the second hash may be received after the first hash. At block 408, the method may include determining, based on the first and second sequence numbers, if the first hash can be combined with the second hash and at block 410 the method may include combining the first hash and second hash into a partial hash. At block 412, the method may include reconstructing the final hash value using the partial hash. The method may proceed to block 414, where the method may end.

Figure 5:
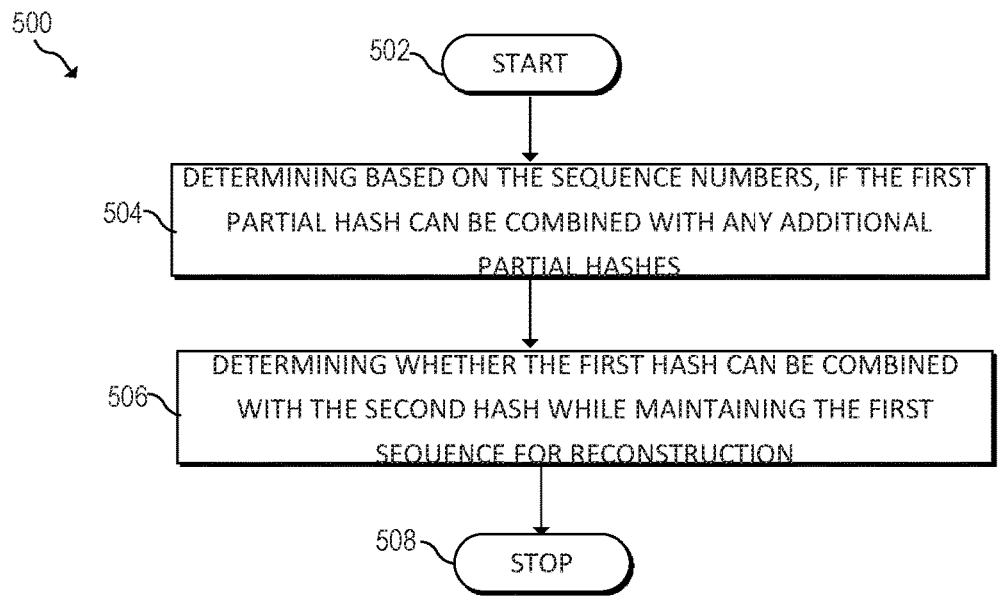
FIG. 5 is a flowchart of example method for combining hashes during memory integrity monitoring.

FIG. 5 is a flowchart of an example method 500 for combining hashes during memory integrity monitoring. Method 500 may be described below as being executed or performed by a system, for example, system 100 of FIG. 1A, system 200 of FIG. 2 or memory module 302 of FIG. 3. Other suitable systems and/or computing devices may be used as well. Method 300 may be implemented in the form of executable instructions stored on at least one machine-readable storage medium of the system and executed by at least one processor of the system. The processor may include a memory integrity monitoring processor, a Central Processing Unit (CPU) or another suitable hardware processor. The machine-readable storage medium may be non-transitory. Method 500 may be implemented in the form of electronic circuitry (e.g., hardware). At least one block of method 500 may be executed substantially concurrently or in a different order than shown in FIG. 5, unless noted otherwise. Method 500 may include more or less blocks than are shown in FIG. 5. Some of the blocks of method 500 may, at certain times, be ongoing and/or may repeat. Method 500 may be implemented together with methods 400 and/or 600.

Method 500 may start at block 502 and continue to block 504, where the method may include determining based on the sequence numbers, if the first partial hash can be combined with any additional partial hashes. At block 506 the method may include raising an interrupt if the final hash value does not match the digest hash value. The method may proceed to block 508, where the method may end.

Figure 6:
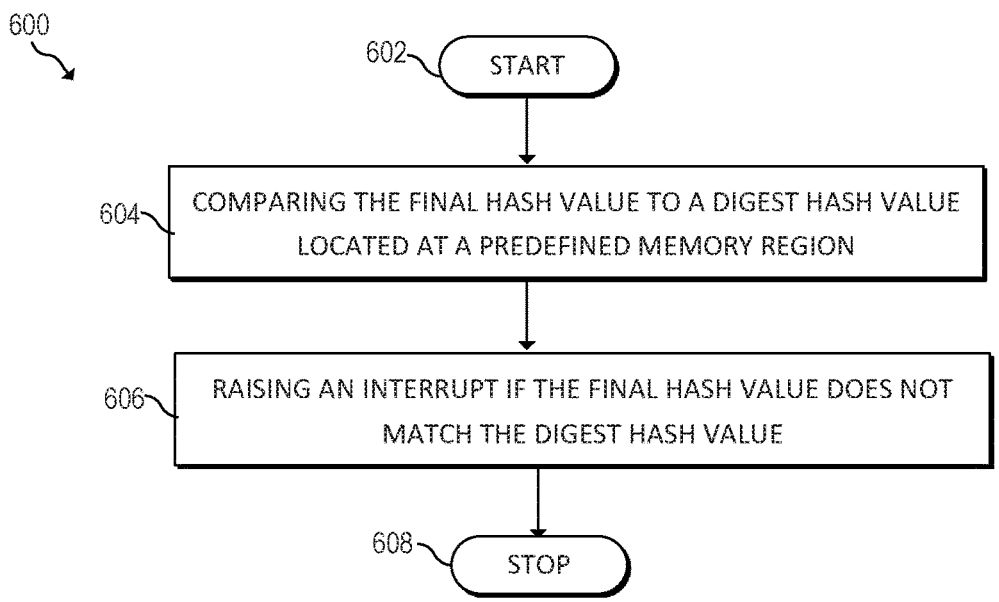
FIG. 6 is a flowchart of example method for comparing hashes to digest values during memory integrity monitoring.

FIG. 6 is a flowchart of an example method 600 for comparing hashes to digest values during memory integrity monitoring. Method 600 may be described below as being executed or performed by a system, for example, system 100 of FIG. 1A, system 200 of FIG. 2 or memory module 302 of FIG. 3. Other suitable systems and/or computing devices may be used as well. Method 600 may be implemented in the form of executable instructions stored on at least one machine-readable storage medium of the system and executed by at least one processor of the system. The processor may include a memory integrity monitoring processor, a Central Processing Unit (CPU) or another suitable hardware processor. The machine-readable storage medium may be non-transitory. Method 600 may be implemented in the form of electronic circuitry (e.g., hardware). At least one block of method 600 may be executed substantially concurrently or in a different order than shown in FIG. 6, unless explicitly noted otherwise. Method 600 may include more or less blocks than are shown in FIG. 6. Some of the blocks of method 600 may, at certain times, be ongoing and/or may repeat. Method 600 may be implemented together with methods 400 and/or 500.

Method 600 may start at block 602 and continue to block 604, where the method may include comparing the final hash value to a digest hash value located at a predefined memory region. At block 606 the method may include raising an interrupt if the final hash value does not match the digest hash value. The method may proceed to block 608, where the method may end.

The foregoing disclosure describes a number of examples for memory integrity monitoring. The disclosed examples may include systems, devices, computer-readable storage media, and methods for memory integrity monitoring. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A system comprising:
a first memory module; and
a first memory integrity monitoring processor embedded to the first memory module, the first memory integrity monitoring processor to:
  receive, from a second memory integrity monitoring processor coupled to a second memory module, a second hash corresponding to a second memory region of the second memory module, wherein the second hash includes a second sequence number for reconstruction of a final hash value and the second hash is not sequentially a first number in a sequence for reconstruction of the final hash value;
  receive, from a third memory integrity monitoring processor coupled to a third memory integrity monitoring processor, a third hash corresponding to a third memory region of the third memory module, wherein the third hash includes a third sequence number for reconstruction of the final hash value ;
  determine, based on the second and third sequence numbers, if the second hash can be combined with the third hash;
  combine the second hash and third hash into a partial hash; and
  reconstruct the final hash value using the partial hash.

2. The system of claim 1 wherein in the sequence is an order for accurately reconstructing the final hash value.

3. The system of claim 1 wherein the second sequence number denotes a location of the second hash in the sequence.

4. The system of claim 1 wherein the first processor is further to:
determine based on the second and third sequence numbers, if the second partial hash can be combined with any additional partial hashes.

5. The system of claim 1 wherein the processor is further to:
further determine whether the second hash can be combined with the third hash while maintaining the sequence for reconstruction.

6. The system of claim 1 wherein the third sequence number for reconstruction is either immediately sequentially before the second sequence number for reconstruction or immediately sequentially after the second sequence number for reconstruction.

7. The system of claim 1 wherein the second and third memory module store system software data structures that are supposed to be unchanged at runtime.

8. The system of claim 1 wherein the first memory integrity monitoring processor hashes data stored on the first memory module to create a first hash corresponding to a first region of the first memory module and the second hardware processor hashes data stored on the second memory module to create the second hash.

9. A first memory module comprising:
an embedded memory integrity monitoring processor to:
  hash a data structure, stored on the first memory module, to create a first hash with a first sequence number for reconstruction of a final hash value, the first hash corresponding to a first memory region of the first memory module;
  receive a plurality of hashes from a plurality of respective memory modules, each hash corresponding to a memory region of the respective memory module and each hash having a respective sequence number for reconstruction of the final hash value;
  determine, for each hash value received, if the hash value can be combined with the first hash or another previously received hash;
  combine at least two hashes into a partial hash, wherein the partial hash does not include the first sequential number of the reconstruction sequence; and
  reconstruct the final hash value using the partial hash.

10. The first memory module of claim 9, wherein a memory region accessed by system software is spread over multiple memory modules including the first memory module and the respective memory modules.

11. The first memory module of claim 9, wherein the embedded processor performs the determination step as each hash value is received.

12. The first memory module of claim 9, wherein the order that the hashes are received in does not match the reconstruction sequence ordering number for reconstruction of the value.

13. The first memory module of claim 9, wherein in the reconstruction sequence is an order for accurately reconstructing the final hash value.

14. The first memory module of claim 9, the embedded memory integrity monitoring processor further to
compare the final hash value to a digest hash value located at a predefined memory region; and
raise an interrupt if the final hash value does not match the digest hash value.

15. A method comprising:
receiving, from a first hardware processor coupled to a first memory module, a first hash with a first sequence number for reconstruction of a final hash value, wherein the fist hash includes a first sequence number for reconstruction of a final hash value and the first hash is not sequentially a first number in a sequence for reconstruction of the final hash value;
receiving, from a second processor coupled to a second memory module, a second hash with a second sequence number for reconstruction of the final hash value wherein the second hash includes a second sequence number for reconstruction of the final hash value and the second hash is received after the first hash;
determining, based on the first and second sequence numbers, if the first hash can be combined with the second hash;
combining the first hash and second hash into a partial hash; and
reconstructing the final hash value using the partial hash.

16. The method of claim 15 comprising:
determining based on the sequence numbers, if the first partial hash can be combined with any additional partial hashes.

17. The method of claim 15 comprising:
determining whether the first hash can be combined with the second hash while maintaining the sequence for reconstruction.

18. The method of claim 15, comprising:
comparing the final hash value to a digest hash value located at a predefined memory region; and
raising an interrupt if the final hash value does not match the digest hash value.

19. The method of claim 15 wherein a memory region accessed by system software is spread over multiple memory modules including the first memory module and the second memory modules.

20. The method of claim 15 wherein the first sequence number denotes a location of the first hash in the sequence.

* * * * *